April 4, 1961  C. N. SIMM  2,977,792
METHOD FOR DETECTING FLUID FLOW IN OR NEAR A WELL BORE
Filed June 21, 1957  2 Sheets-Sheet 1

INVENTOR
CLARKE N. SIMM
BY
ATTORNEYS

April 4, 1961 C. N. SIMM 2,977,792
METHOD FOR DETECTING FLUID FLOW IN OR NEAR A WELL BORE
Filed June 21, 1957 2 Sheets-Sheet 2

INVENTOR
CLARKE N. SIMM
BY
ATTORNEYS

2,977,792
Patented Apr. 4, 1961

2,977,792

METHOD FOR DETECTING FLUID FLOW IN OR NEAR A WELL BORE

Clarke N. Simm, Fullerton, Calif., assignor to California Research Corporation, San Francisco, Calif., a corporation of Delaware Filed June 21, 1957, Ser. No. 667,126

3 Claims. (Cl. 73—155)

This invention relates in general to well surveying and relates more particularly to methods for determining the direction and velocity of fluid movement along or normal to a subterranean well bore and either inside or outside of the well bore casing.

There are numerous applications where it is desirable or required to obtain information concerning the flow of fluid into or out of a well bore. Such fluid flow may be in connection with a producing well in which water from an overlying on underlying water sand is flowing into the borehole along with the oil to be produced. Such water flow is, of course, undesirable, and is usually indicative of a leak in the borehole casing or channelling in the cement which secures the casing to the borehole wall, or both. Heretofore, the location of such leaks has been difficult, owing to the large surface area over which the leak or leaks could possibly be located, and the inaccessibility of the zone in which the leaking or entry occurred.

Broadly, the present invention contemplates methods for determining the direction and velocity of such fluid flow by measuring the diffusion of heat vertically along the well bore as a result of such flow. In accordance with this invention, a quantity of heat is released at a predeterminable point in the well bore and the diffusion of this heat from the point of release is measured by a temperature-sensitive instrument. The theory of the invention is that in the absence of any undesired fluid flow, the heat will be diffused fairly uniformly in both directions from the point of release, but with fluid flow occurring at or near the point of heat release, the heat will be asymmetrically diffused in the direction of fluid flow by the increased cooling action of the fluid flow. Thus, by measuring the temperature in the well bore in relation to the point of heat release, such asymmetrical diffusion may be detected, to locate the direction of undesired fluid flow. As an additional refinement of the invention, if it is desired to know the approximate velocity of the undesired fluid flow, the diffusion of heat may also be correlated with time, so that a measure of the fluid flow velocity is thereby obtained.

It is therefore an object of the present invention to provide improved methods for determining characteristics of fluid flow in a subterranean well bore.

It is an addtional object of the present invention to provide methods for determining the direction of fluid flow along or normal to a well bore, and either inside or outside the casing thereof, by measuring the diffusion of a quantity of heat in said well bore as a result of said fluid flow.

It is a further object of this invention to provide methods for determining the direction of fluid flow along or normal to a well bore by releasing a quantity of heat therein and measuring the diffusion of this heat as a function of depth in the well bore to detect asymmetrical diffusion of the heat indicative of the cooling action of said fluid flow.

It is an additional object of the present invention to provide methods for determining the direction and velocity of fluid flow along or normal to a well bore by releasing a quantity of heat therein and measuring the diffusion of this heat as a function of time and of depth in the well bore to detect asymmetrical diffusion of the heat indicative of the cooling action of said fluid flow.

Additional objects and advantages of the present invention will be readily apparent from the following description when read in connection with the accompanying drawing, in which:

Fig. 1 diagrammatically illustrates apparatus for carrying out the present invention disposed in a representative well bore;

Figures 1, 2:
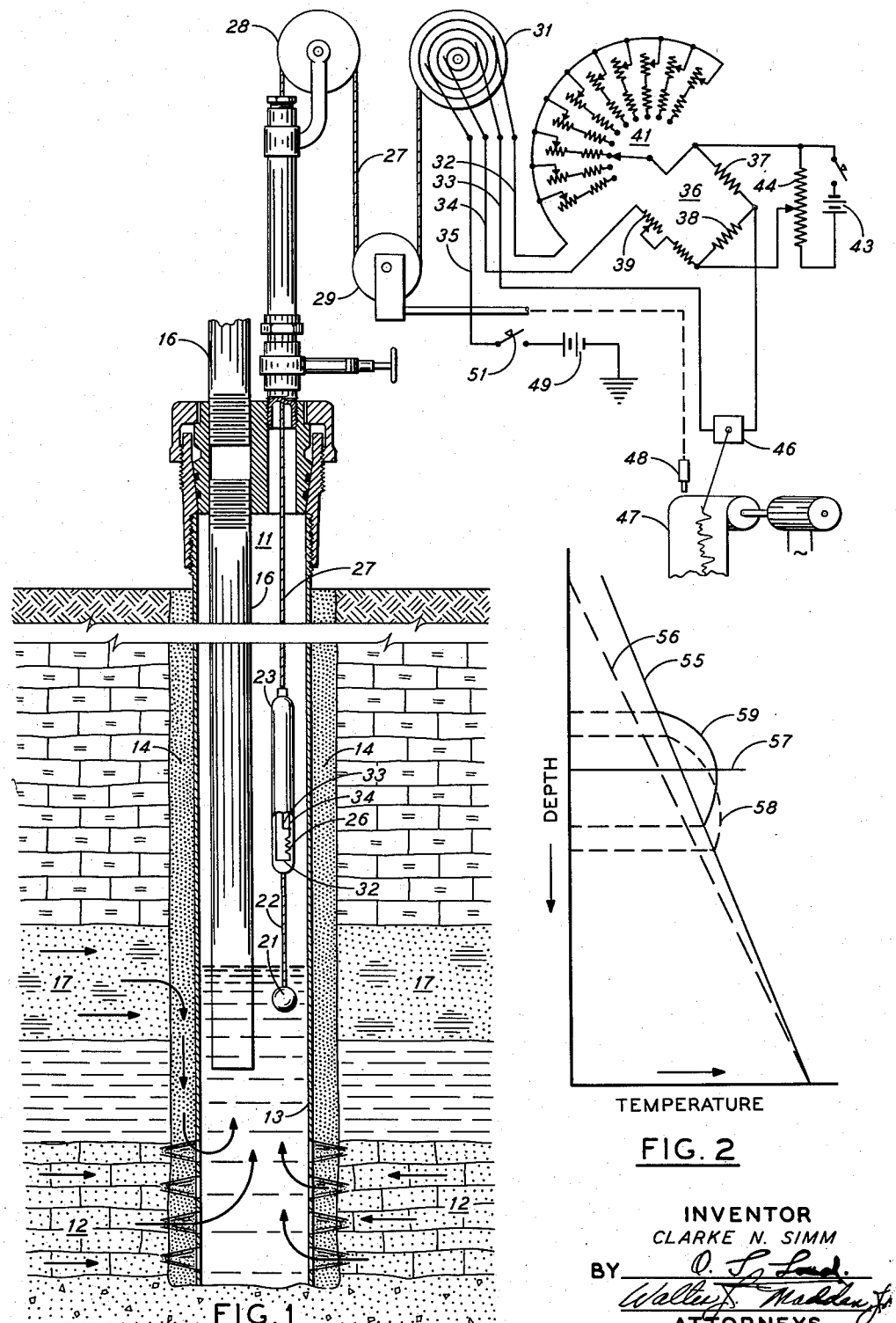
Fig. 2 is a graph illustrating the temperature-depth relationships existing in the well bore of Fig. 1.
Figure 4:
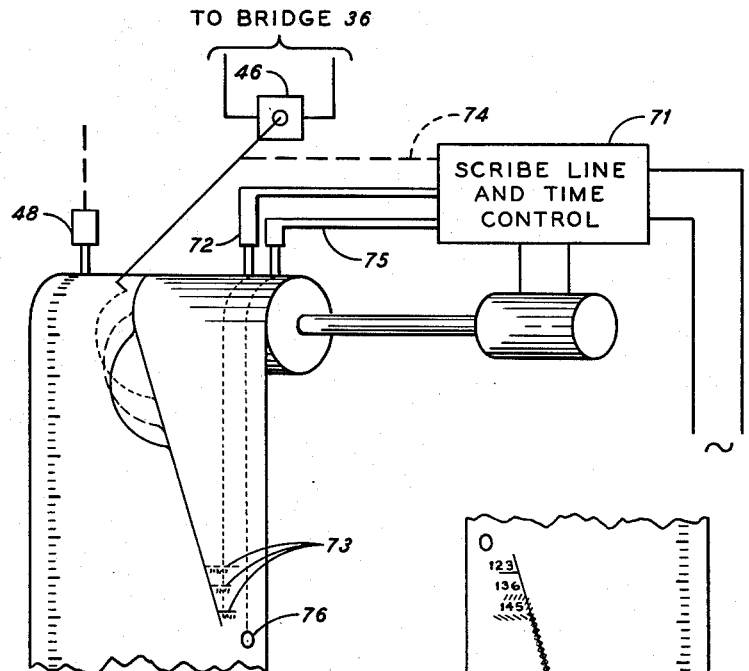
Fig. 4 is a modification of the printing apparatus for producing repeated temperature profiles along a well bore.
Figure 5:
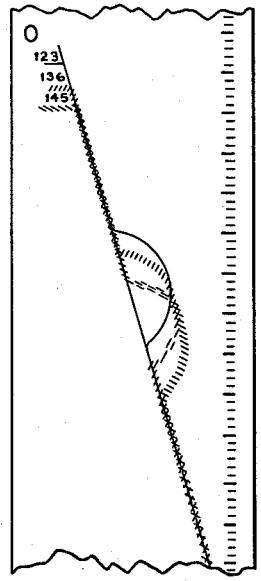
Fig. 5 illustrates an idealized record produced by the apparatus of Fig. 4.

Referring to Fig. 1 by character of reference, numeral 11 designates a well bore which penetrates a number of subterranean strata to communicate with an oil-bearing strata 12. Well bore 11 is provided with a causing member 13 which is cemented in position by cementing material 14. Well bore 11 is provided with a tubing string 16 which extends from the earth's surface to the fluid level in the bore for withdrawing the fluid therein, in a manner well known in the art. In the normal operation of the well, oil flows from sand 12 into the borehole 11 and is withdrawn through tubing string 16 to the surface. In the particular instance illustrated, however, this production is complicated by the flow of water from a water-producing zone 17 through cement 14 and into the borehole along with the oil. In the illustrated embodiment, the most difficult case from a detection standpoint is assumed, namely, that of water flow through the cement 14 for a considerable distance outside of casing 13. However, it will be understood that the present invention is equally operative where the water flows directly into the cased hole from the water-producing sand. Such water production is, of course, undesirable, and indicates that the cementing material 14 has failed to completely seal off this water sand from the oil-producing zone.

It will be noted from Fig. 1 that the area of leakage of the water into the cement is not the same as the area of entry of the water into the well bore, since the water travels downwardly through the cement 14 some distance before entering the well bore through the casing perforations. Thus, an attempt to locate the point or area of water leakage by locating its point of entry into the well bore would be unsuccessful, and might result in the re-cementing of a portion of the casing, i.e., the portion adjacent oil-producing zone 12, which was not in fact defective.

To accurately locate the point of leakage and to determine the direction and velocity of the leakage in accordance with the present invention, a suitable source of heat is disposed in the borehole and the diffusion of heat from this source is detected. In the embodiment illustrated in Fig. 1, the heat source is assumed to be in the form of an electrically or percussion ignited pyrotechnic device 21 which is suspended on a cable 22 through which suitable electric ignition conductors run. Other heat sources which are suitable for the invention include jet engine chemical igniters, and flares such as the railroad or truck type. Cable 22 is connected to the lower end of a sinker bar 23 having at the lower end thereof a temperature-sensitive device. In the preferred form of the present invention, the temperature-sensitive device is in the form of a thermistor resistance element 26 whose resistance varies as a function of temperature. Thermistor 26 may be suitably mounted in the lower end of sinker bar 23 so as to be exposed to the temperature in the well bore, while being protected against mechanical damage while being run in and out of the hole.

Sinker bar 23 is suspended in well bore 11 by a cable 27 through which the various electrical conductors run and which extends to the surface of the earth. Cable 27 passes through an opening in the well head fitting shown, and then passes over a pair of sheaves 28 and 29 to a winch drum 31. Winch 31 is provided with a suitable commutating arrangement for conveying the electrical signals transmitted through cable 27 to the appropriate circuits. Resistor 26 has three conductors 32, 33 and 34 connected thereto as shown, and these conductors extend through cable 27 to the surface recording equipment. Such equipment includes a bridge circuit 36 having two arms formed by resistors 37 and 38, a third arm formed by a decade resistance device 41, cable conductor 32 and resistor 26; and a fourth arm formed by a resistor 39 and cable conductor 34. Power is supplied to bridge 36 from a battery 43 through a switch which connects battery 43 to a voltage divider 44. As is well known in the art, decade resistance device 41 comprises ten different resistance elements which may be selectively connected in different combinations to provide different values of resistance. Decade device 41 is provided to compensate for changes in calibration of thermistor 26 in different temperature ranges, as will be described more in detail below.

The connection of conductors 32, 33 and 34 to bridge 36 in the manner shown provides compensation for variations in the resistance of these conductors as their temperature varies with variations in the length of cable 27 in the well bore, since, as will be noted, conductors 32 and 34 are effectively connected to adjacent arms of bridge 36, so that their resistance variations neutralize each other. The illustrated three conductor connection is preferably utilized for maximum accuracy, but it will be apparent that, if desired, resistor 26 may be connected to the bridge by only two conductors.

The output signal from bridge 36, which appears across conductor 33 and the junction between resistors 37 and 38, is supplied to a suitable recording device such as a recorder 46 which drives a pen over a chart 47. Chart 47 is provided with an indication of the surveyed depth from a depth-marking device 48 which is associated with sheave 29. A fourth conductor 35 from winch 31 leads to the energizing circuit for heat-releasing device 21. A battery 49 provides current to ignite device 21 through a switch 51 and conductor 35.

The operation of the embodiment illustrated in Fig. 1 is as follows: Prior to running the survey, the instrument is calibrated so that the resistance of resistor 26 is known for all values of temperature in the temperature range to be used. The temperature-sensitive device and pyrotechnic device are run into the borehole and positioned in the approximate vicinity where the undesired fluid flow is believed to be occurring. Switch 51 may then be closed to supply current from battery 49 to ignite device 21 and thus release a large quantity of heat in the well bore. The position or point of this release may be accurately determined by means of depth marking device 48.

The logging device may then be raised and lowered in the borehole in the vicinity of the point of heat release, and the temperature of the well bore for a suitable distance on either side of the release point may be detected by thermistor 26 and the associated bridge circuit 36. As will be readily apparent, variations in the temperature in the well bore will effect corresponding variations in the resistance of thermistor 26, and these resistance variations will be reflected in the output of bridge 36. This output is supplied to recorder 46 where it is recorded on chart 47 in correlation with the depth-indicating signal from device 48, so that a measure of the variations in the temperature of borehole 11 as a function of depth is obtained. If the well bore temperature varies over a considerable range, the different resistors in decade box 41 may be used to insure operation in any desired temperature range.

The graph of Fig. 2, which is a plot of temperature as a function of depth, illustrates the operation of the present invention in the application illustrated in Fig. 1. In Fig. 2, line 55 represents the temperature profile of well bore 11 when producing, and line 56 represents the temperature profile when shut-in. As can be seen from these graphs, the temperature of the well bore decreases with decreasing depth as the earth's surface is approached. Also, the temperature of the well as the surface is approached is higher when the well is producing than when shut-in, by virtue of the heating of the well bore by the warm fluid being withdrawn upwardly.

Horizontal line 57 represents the position or depth in the well bore at which the heat from device 21 is released, and in the illustrated embodiment, it is assumed that this point of release is opposite the water-producing zone 17 from which water is flowing into cement 14. After the release of the heat from device 21, the flow of water from zone 17 through the cement causes the released heat to be diffused more rapidly downwardly, in the direction of the water flow, than upwardly. This results in a temperature profile represented by the dashed curve 58, showing the asymmetrical diffusion of heat with respect to the point of heat release represented by line 57. Curve 58 is a plot of temperature as a function of depth similar to that which would be recorded on chart 47 under the circumstances assumed in Fig. 1, and would clearly indicate the action of the flow of water. The solid curve 59 of Fig. 2 represents the temperature profile which should result if there is no water flow in the logged portion of the well bore. Curve 59 is substantially symmetrical about line 57, illustrating the symmetrical diffusion of heat which should result if there is no water flow to distort the diffusion pattern.

Figure 3:
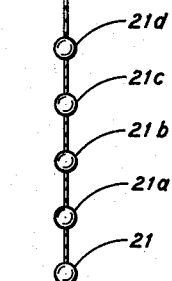
Fig. 3 is an alternative form of apparatus illustrating heat sources.

It will be appreciated that several attempts may have to be made in a given well bore before the exact location of the water zone can be determined with the accuracy illustrated in Fig. 2. To increase the speed with which such surveys can be run, a plurality of pyrotechnic devices 21, 21a, 21b, 21c and 21d, as illustrated in Fig. 3, and arranged to be sequentially ignited, may be provided on the surveying tool so that traverses of a number of different areas may be made without requiring that the logging tool be withdrawn from the well bore.

To obtain information as to the velocity of the fluid flow, in addition to the information as to the direction and location, suitable means may be provided. For example, chart 47 may be provided with a suitable scribe line and time control 71 including mechanism 72 which provides a timing index at 73 on the chart, mechanism 74 for modifying the pattern of printing on the chart as by mechanically jarring or moving the scribe, and mechanism 75 for cooperation with a hole 76 on the record to reposition the chart to an accurate "start-point" for subsequent reprints on the record, so that by correlating depth, temperature, and time, an indication of the velocity of fluid flow may be obtained. Additionally, information as to the rate of movement of the hot spot, the rate of dissipation of the maximum temperature in the hot spot, and the magnitude of the water flow, may be determined by correlating the recorded temperatures with time and depth.

The method of the present invention is intended to give a direct, interpretable indication of fluid flow in the cementing material within the annular space between the casing and the borehole of a producing oil well. This condition is frequently found where a petroleum crude producing formation is separated from a water producing formation by an impervious strata such as a shale strata. When two such formations are penetrated by a well bore and it is desired to produce fluids from the crude producing formation only the usual practice is to case the borehole by positioning metal casing to at least the depth of the crude producing formation and then pump cementing material into the annular space between the metal casing and the borehole. The casing may have a slotted portion at the bottom or may then be perforated, in a well known manner, adjacent to the crude producing formation to establish passageways for the petroleum crude from the formation into the interior of the casing. In such a procedure within a well bore penetrating both water and crude producing formations it is essential that the water producing formation be sealed from the crude producing formations and this function is usually accomplished by control of the cementing material employed. On some occasions, either because the water producing formation was originally undetected or because the cementing material is too porous or has developed passage routes for the water through a poor seal to the well bore or cracks in the cement paralleling the casing, the production of water with this desired crude becomes apparent. On such an occasion it is desirable to know the existence of this water flow and the direction from which the water is coming.

Procedures are known for detecting unwanted fluids in the fluids produced from a subterranean well. With the aid of the present invention the existence of fluid flow through the cementing material may now be detected so that measures may be taken to counteract this unwanted fluid production. The method of the present invention is intended for use in detecting fluid flow through the cementing material where a zone of desired production is separated from a zone of undesired production by an impervious stratum. Fluids flowing through the stratum itself may be detected by other known means such as by sampling the formations along the well bore before the casing has been set whereas the method of the present invention may be used to detect fluid flow parallel to the cased well and without removing the casing and the cementing material within the annular space between the casing and the well bore.

Although but a few embodiments have been illustrated and described, it will be readily apparent to those skilled in the art that various changes may be made therein without departing from the invention or the scope of the appended claims.

I claim:
1. The method of determining the direction of flow of undesired fluid in the cementing material between a well casing and a well bore penetrating a subterranean formation, said casing being perforated at a petroleum producing zone within said subterranean formation and said undesired fluid flowing from a second zone into said casing through said cementing material and said perforations comprising the steps of determining the temperature profile along said casing, releasing a significant amount of heat within said casing in a substantially localized area adjacent to said second zone, again determining the temperature profile along said casing as a function of depth after said release of said heat, correlating said two temperature profiles to detect diffusion of said heat from said localized area, and comparing said detected diffusion after said release to normal temperature diffusion of heat from within a well casing to indicate asymmetrical diffusion of said heat from said localized area whereby the direction of movement of said undesired fluid in said cementing material is indicated by the direction of said asymmetrical heat diffusion.

2. The method of determining the direction and velocity of the flow of undesired fluid in the cementing material between a well casing and the well bore penetrating a subterranean earth formation wherein petroleum crudes are being produced from a first zone within said formation and wherein said undesired fluid is flowing from a second zone into said producing zone through said cementing material comprising the steps of shutting-in said well casing to terminate production of petroleum crude and said undesired fluid, transporting a temperature sensitive probe along said shut-in casing to establish the temperature profile along said casing, opening said well casing to return to fluid production, releasing a significant amount of heat within said casing at a localized area substantially adjacent to said second zone, again transporting said temperature sensitive probe along said well bore to establish a second temperature profile after the release of said heat, correlating said first and second temperature profiles to indicate the diffusion of said heat along said well bore from said localized area, detecting asymmetrical diffusion of said heat from said localized area as an indication of the direction of movement of said undesired fluid within said cementing material, repeating said transporting of said temperature sensitive probe through said well bore to establish repeated temperature profiles along said well casing, and correlating said repeated temperature profiles to indicate the rate of diffusion of said heat within said well casing as a determination of the velocity of movement of said undesired fluid through said cementing material.

3. The method of determining the direction and velocity of flow of undesired fluid in the cementing material between a well casing and the well bore penetrating a subterranean formation, said casing being perforated at a petroleum producing zone within said subterranean formation and said undesired fluid flowing from a second zone into said casing through said cementing material and said perforations, comprising the steps of determining an initial temperature profile along said casing adjacent to said producing and second zones, releasing a significant amount of heat at a localized area in the vicinity of said second zone, raising and lowering a temperature sensitive probe within said casing about said point of release of said heat, recording the temperatures within said casing in relation to time and to the instantaneous depth along said casing to establish a profile of the diffusion from said localized area of said released heat, correlating said initial profile and said profile of diffusion to detect asymmetrical diffusion of said heat along said well casing, determining from the direction of asymmetry the direction of flow of said undesired fluid from said cementing material, and determining from said recorded temperatures in relation to time the rate of flow of said undesired fluid through said cementing material.

References Cited in the file of this patent
UNITED STATES PATENTS

| | | |
|---|---|---|
| 2,191,765 | Lohman | Feb. 27, 1940 |
| 2,290,075 | Schlumberger | July 14, 1942 |
| 2,311,757 | Jakosky | Feb. 23, 1943 |
| 2,697,941 | Moore et al. | Dec. 28, 1954 |
| 2,787,906 | Piety | Apr. 9, 1957 |